Jan. 5, 1926.

R. WARNOCK

CREAM SEPARATOR

Filed May 22, 1922

1,568,645

6 Sheets-Sheet 1

INVENTOR
Robert Warnock
BY
ATTORNEYS

Jan. 5, 1926.

R. WARNOCK

CREAM SEPARATOR

Filed May 22, 1922   6 Sheets-Sheet 2

1,568,645

INVENTOR
Robert Warnock
BY
ATTORNEYS

Jan. 5, 1926. 1,568,645
R. WARNOCK
CREAM SEPARATOR
Filed May 22, 1922  6 Sheets-Sheet 3
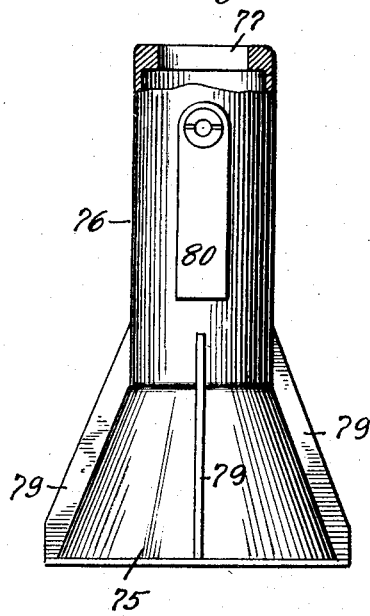
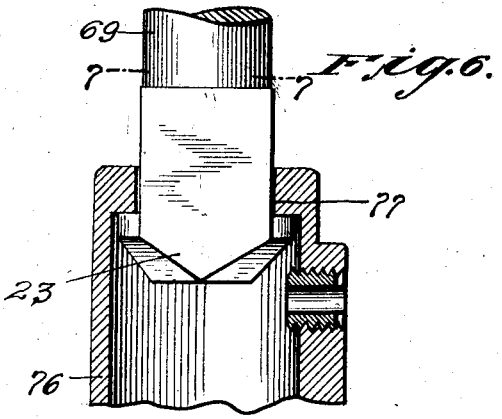
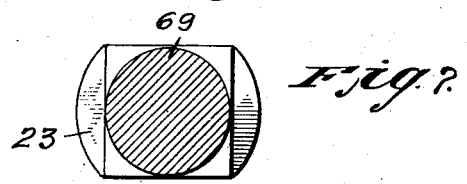
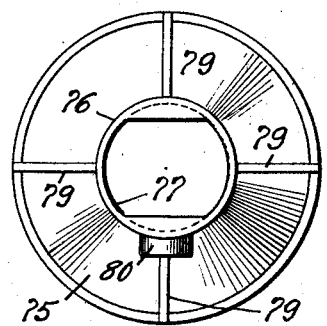
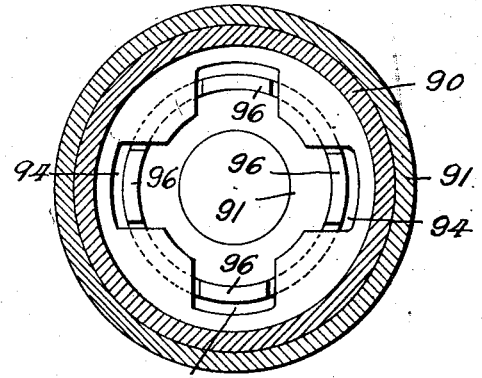
INVENTOR
Robert Warnock
BY
ATTORNEYS Jan. 5, 1926.　　　　　　　　　　　　　　　1,568,645
R. WARNOCK
CREAM SEPARATOR
Filed May 22, 1922　　　　　　6 Sheets-Sheet 4
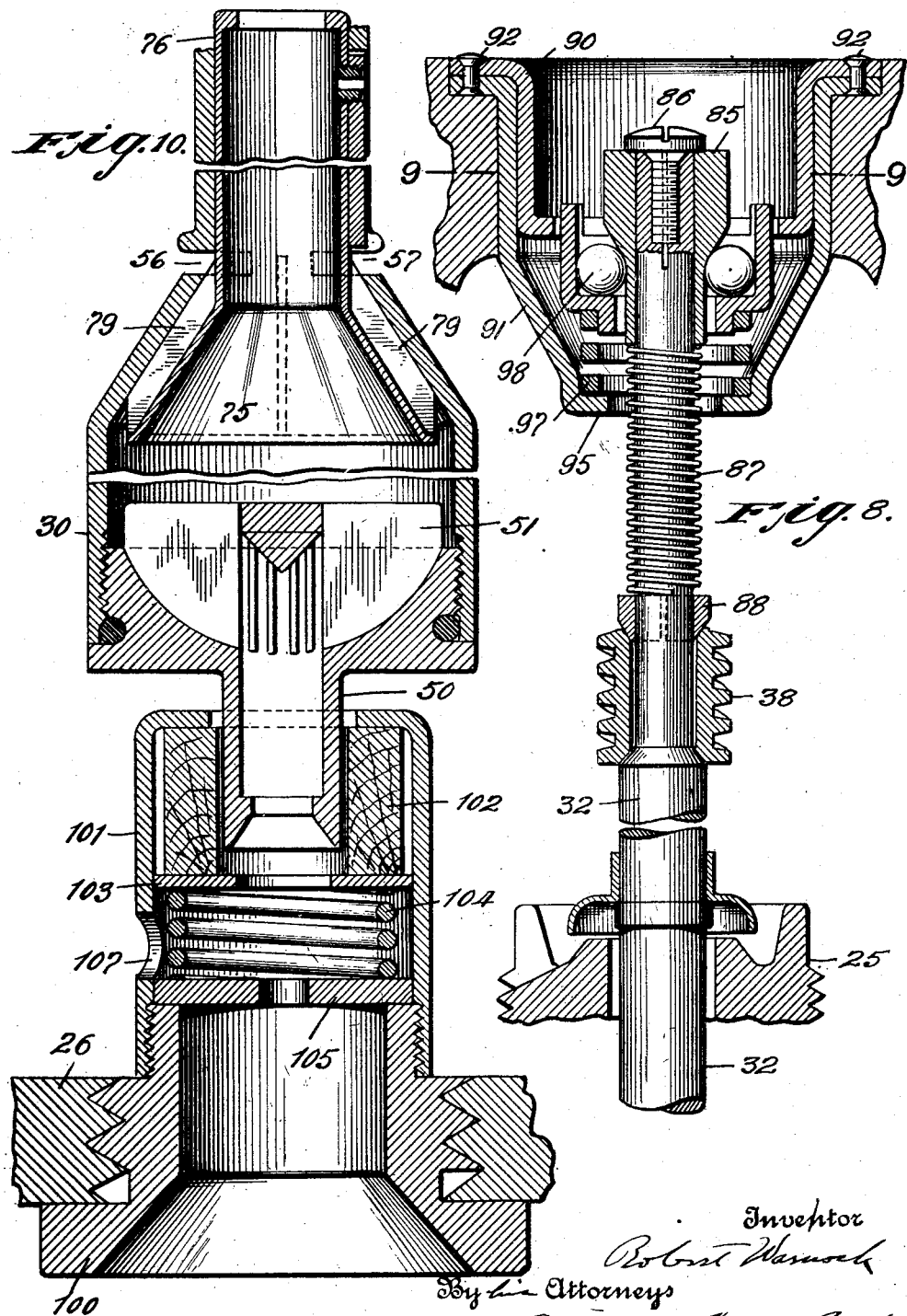

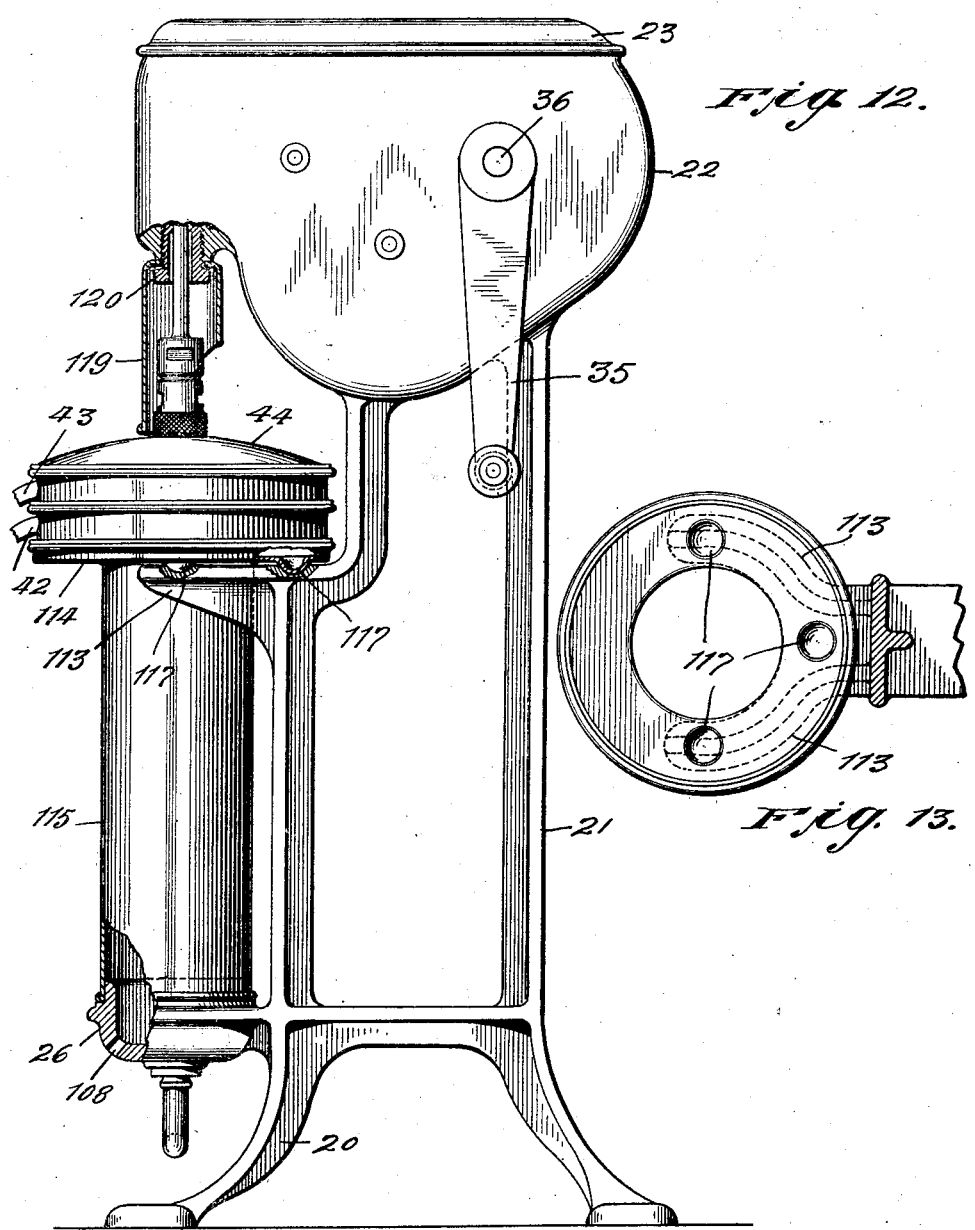

Jan. 5, 1926.   R. WARNOCK   1,568,645
CREAM SEPARATOR
Filed May 22, 1922   6 Sheets-Sheet 6

INVENTOR
Robert Warnock
BY
ATTORNEYS

Patented Jan. 5, 1926.

1,568,645

UNITED STATES PATENT OFFICE.

ROBERT WARNOCK, OF WEST CHESTER, PENNSYLVANIA.

CREAM SEPARATOR.

Application filed May 22, 1922. Serial No. 562,858.

*To all whom it may concern:*

Be it known that I, ROBERT WARNOCK, a citizen of the United States, residing in West Chester, county of Chester, and State of Pennsylvania, have invented certain new and useful Improvements in Cream Separators, of which the following is a specification.

This invention relates to cream separators and particularly to tubular separators of the general type shown in U. S. Letters Patent to Herbert McCornack No. 795,360, dated July 25, 1905.

The general object of the invention is to provide a new and improved separator of the type above mentioned, which will be simple in construction, efficient in operation, and easily cleaned.

One of the features of the invention relates to an improved construction and arrangement of casing surrounding the bowl. Another relates to an improved coupling between the driving shaft and the bowl. Another relates to a coupling guard. Another relates to an improved construction and arrangement of dividing wall at the upper end of the bowl. Another relates to an improved construction of top bearing for the driving shaft. And still another relates to an improved construction of steadying bearing below the bowl.

Figure 1:
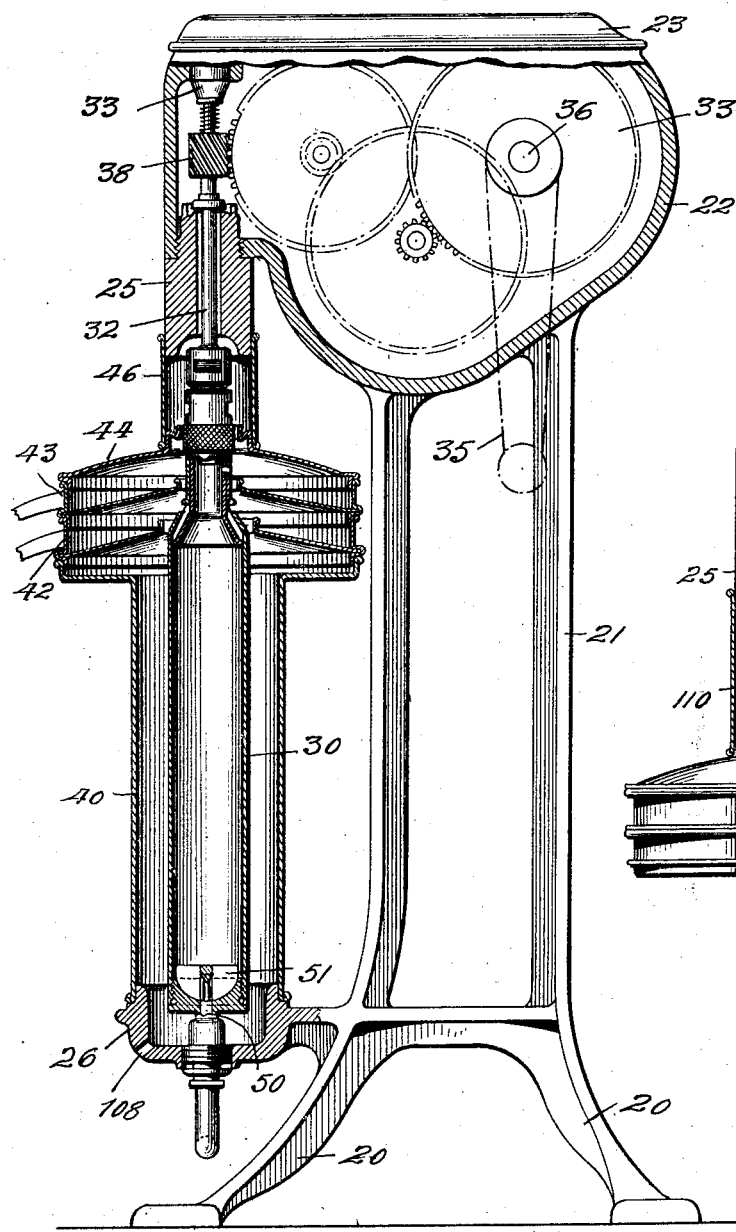
Figure 11:
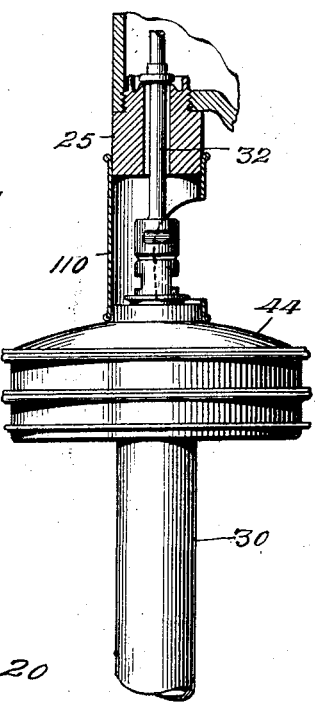
Figure 2:
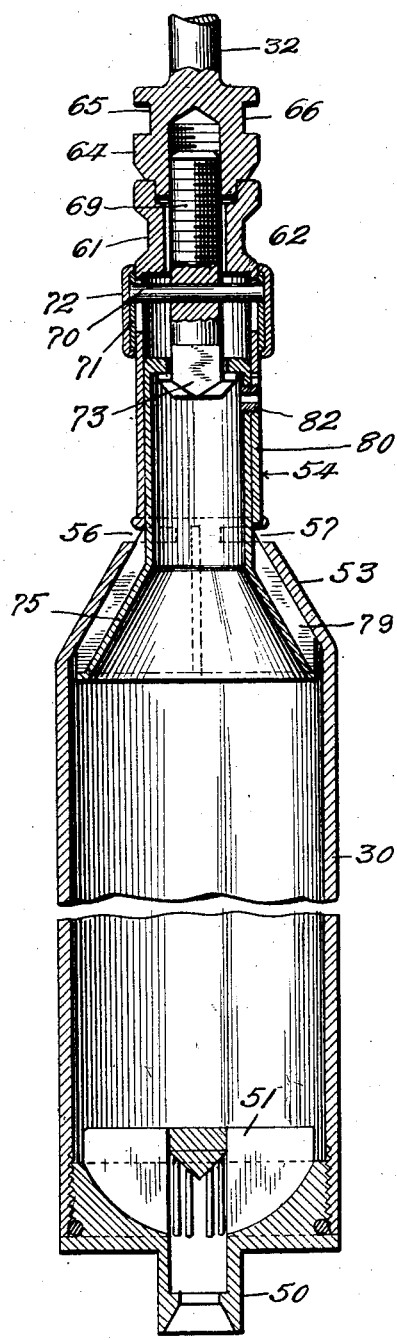
Figure 3:
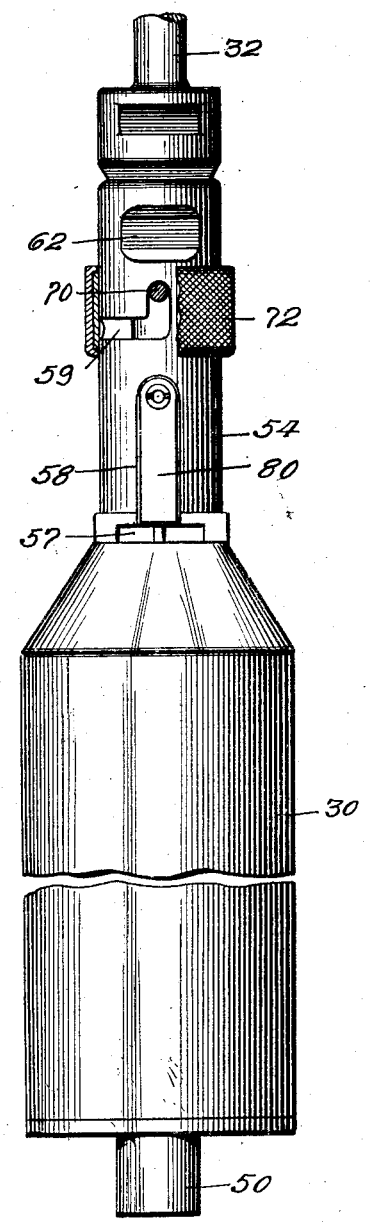
Figure 14:
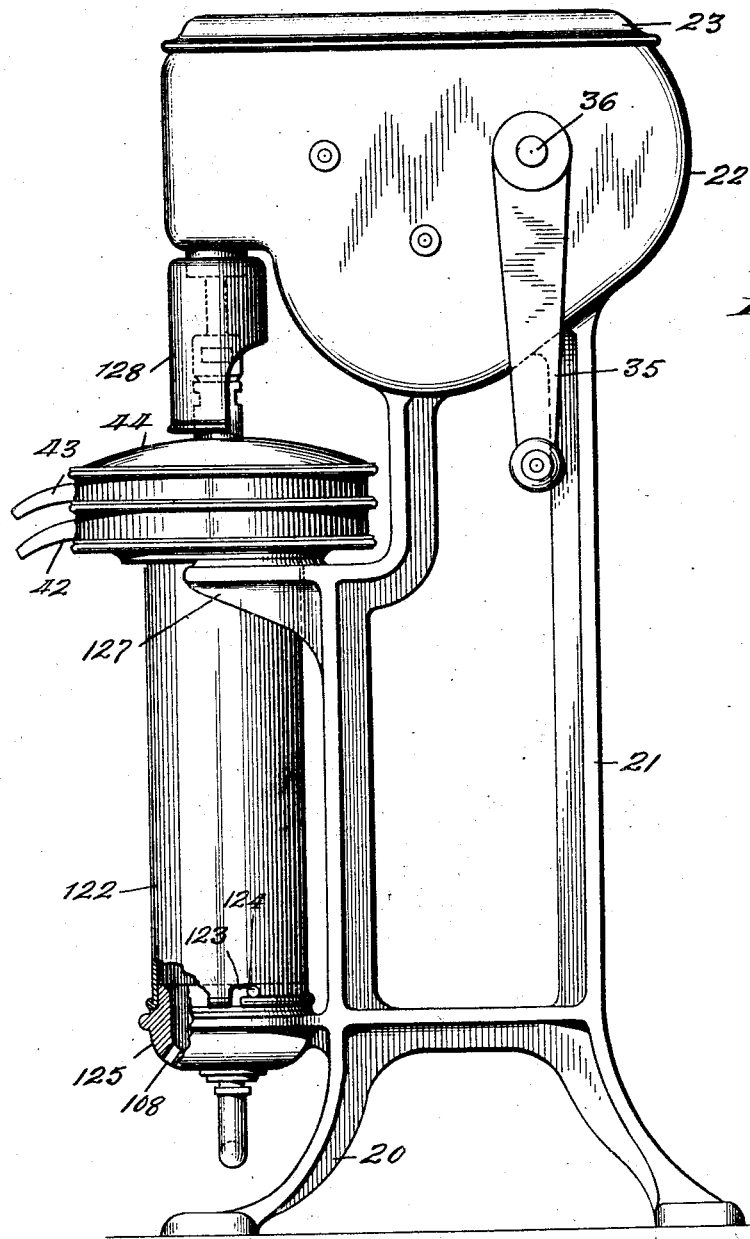

The invention will be understood from the following description taken in connection with the accompanying drawings in which Figure 1 is a side elevation partly in section thru one form in which my invention may be embodied; Figure 2 is a sectional elevation of a bowl and shaft coupling having my invention embodied therein; Figure 3 is an elevation partly in section taken at right angles to Figure 2; Figure 4 is an elevation partly in section of the dividing wall adapted to be inserted in the top of the bowl; Figure 5 is a top plan view of the part shown in Figure 4; Figure 6 is a side elevation partly in section showing how the dividing wall is engaged by the coupling bolt; Figure 7 is a section thru the coupling bolt on the line VII—VII of Figure 6; Figure 8 is a sectional elevation of the top of the driving shaft and the top bearing therefor; Figure 9 is a section thru the top bearing for the driving shaft on the line IX—IX of Figure 8, with the driving shaft and the balls of the ball bearing removed; Figure 10 is a sectional elevation on an enlarged scale, showing particularly the construction at the top of the bowl and the construction of the steadying bearing; Figure 11 is a side elevation partly in section of a modification of the coupling guard shown in Figure 1; Figure 12 is a side elevation partly in section showing a modification in the structure of the bowl casing and supporting means therefor; Figure 13 is a plan of the bowl casing shown in Figure 12 with the supporting frame partly in section; Figure 14 is a side elevation partly in section, of another form of bowl casing.

Referring to Figure 1, the various parts of the machine are shown as supported by a frame which may be of any suitable form, and is shown as having legs 20, upright portions 21 supporting a gear casing 22 having a removable cover 23, a removable plug 25 thru which passes the driving shaft, and an extension 26 which serves to support the steadying bearing and the bowl casing as hereinafter mentioned. A cylindrical bowl 30, which at its bottom may be of the well known form shown in the McCornack patent above mentioned, is connected by a new and improved form of coupling to the driving shaft 32 which is suspended from a top bearing 33 supported in the top of the casing 22. The construction at the top of the bowl 30, the construction of the coupling, and the construction of the bearing 33 will hereinafter be described in detail. The shaft 32 is driven from a crank 35 carried on a shaft 36 journaled in the casing 22, thru the medium of speed increasing gearing which is shown as essentially the same as the gearing illustrated in the aforesaid McCornack patent. This gearing terminates in a spiral pinion 38 which is frictionally secured to the shaft 32 in the manner shown in said McCornack patent. Surrounding the bowl 30, is a removable bowl casing 40; and supported by the flanged top of this casing are a skimmed milk pan 42, a cream pan 43, and a pan cover 44, which may be of substantially the same form as the corresponding parts in the machine of the McCornack patent. Surrounding the coupling is a cylindrical guard 46 which, in the form of the invention shown in Figure 1, is slidable vertically upon the outside of the plug 25, into the position shown with its bottom edge cooperating with a flange on the top of the cover 44, or upwardly on the plug 25 so as to permit access to the coupling. From this general description of the principal parts of machine as shown in Figure 1, I will now pass to a detailed description of the various new features of the machine which are shown in detail in the various other figures.

My improved bowl dividing wall and coupling structures are shown in detail in Figures 2, 3, 4, 5, 6, 7, and 10. At its bottom, the bowl 30 is provided with a bowl-bottom of well known form adapted to be screwed into the bowl. This bowl-bottom is provided with the usual boss 50 having an opening therethru, and with wings 51 which help to give the milk entering the bowl the rotary motion of the latter. At its upper end, the bowl 30 is provided with a converging portion 53 to which is connected a neck 54 of the form best shown in Figures 2, 3 and 10. The neck 54 is provided with skim milk openings 56 and 57, a vertical slot 58, partially circumferential and partially vertical slots 59, and with oppositely located flattened portions 61 and 62 adapted to receive a wrench. The upper end of the neck 54 is machined so as to form a coupling face adapted to co-operate with a complementary coupling face on the coupling member 64 which is preferably made integral with the end of the shaft 32 and is provided with wrench receiving surfaces 65 and 66. These coupling faces, when the bowl is in its operative position, are held in engagement with one another by a coupling bolt 69 located within the upper end of the neck 54 and co-operating with a threaded hole in the coupling member 64. The coupling bolt 69 is held within the neck 54 by a pin 70 which passes thru said bolt and thru the slots 59 in the opposite sides of said neck, the ends of said pin 70 being secured in a ring 71 movable on the outside of the neck 54. The ring 71 covers the slots 59 at all times, and said ring may be covered with an outside ring 72 knurled on its outer surface to facilitate moving it with the fingers. The bolt 69, in addition to serving as the means for drawing the coupling faces into snug engagement, serves to hold in the neck 54, a new and improved form of dividing wall which will now be described, the bolt for this purpose being provided with a head 73 which may be of many different forms, one of which is best shown in Figures 6 and 7.

The structure of the dividing wall is best shown in Figures 2, 4 and 5. At its bottom, the dividing wall is provided with a cone shaped portion 75 adapted to conform to the converging portion 53 of the bowl 30; and above that cone shaped portion is a cylindrical portion 76 adapted to slidingly fit the interior of the neck 54 of the bowl. At its upper end, the cylindrical portion 76 of the dividing wall is provided with an opening 77 of the form best shown in Figure 5, adapted to receive the head 73 of the bolt 69. It will be noted that the form of the bolt-head as shown in Figure 7 and the form of the opening 77 are such that, when the bolt-head is inserted in the opening and the bolt is rotated a quarter turn, the bolt-head will be in engagement with the flanged upper end of the dividing wall and will be capable of exerting an upward pull on the latter. The cone-shaped portion 75 of the dividing wall is provided with a plurality of webs 79 which, as clearly shown in Figure 2 act as spacers between the portion 75 of the dividing wall and the converging portion 53 of the bowl 76. The cylindrical portion of the dividing wall is provided with a lug 80 adapted to fill the slot 58 in the bowl-neck 54 when the dividing wall is inserted in the bowl-neck. Located in a threaded hole thru the lug 80 and the dividing wall is a cream screw 82 having an opening therethru communicating with the inside of the upper portion of the dividing wall. The dividing wall, bowl-neck, and coupling bolt are so proportioned that when the dividing wall is inserted in the bowl-neck, it will be held therein by the coupling bolt when the latter is moved to the position corresponding to the location of the pin 70 in the upper end of the slot 59, as shown in Figures 2 and 3. And when the coupling bolt 69 is in its upper position, it is capable of being engaged by the threaded hole in the coupling member 64. By applying wrenches to the wrench faces 61—62 and 65—66, the bolt 69 may be screwed into the coupling member 64 until the coupling faces are drawn into snug engagement with one another; and it will be observed that a clearance is left between the bolt 69 and the inside of the end of the neck 54, so that the bolt is free to adjust itself and will act merely as means for drawing the coupling faces together, these faces being so formed as to provide for proper alignment of the bowl 30 and the driving shaft 32.

The construction of the upper bearing 33 from which the shaft 32 is suspended is shown in Figures 8 and 9. This bearing, in some respects, resembles the bearing shown in McCornack patent hereinbefore mentioned. As in the construction of that patent, the end of the shaft 32 is provided with a cone bearing sleeve 85 secured against upward longitudinal movement on the shaft 32 by means of the screw 86, which screws into the end of the shaft 32 and is provided with a head which overlaps the end of the shaft sufficiently to engage the end of the cone bearing sleeve 85. Surrounding the shaft 32 and engaging the bottom of the sleeve 85, is a spring 87 which is under compression and exerts a longitudinal thrust on the ring 88 which co-operates with the spiral pinion 38 and holds the latter in frictional engagement with a conical shoulder on the shaft 32, as explained in the aforesaid patent to McCornack. The frame of the bearing 33 comprises two nesting cup-shaped portions 90 and 91, which may be riveted together at their upper flanged edges as indicated at 92. These cup-shaped members are adapted to be supported in the top of the gear case 22, and each of said members is provided with an opening thru which the shaft 32 passes. As best shown in Figure 9, the opening in the cup-shaped member 90 is provided with a plurality of radial extensions 94; while the opening in the member 91 is left round, but has a diameter somewhat smaller than the diameter of the outer end of said member 91, whereby the latter is provided with a flange 95. Located between the bottom of the cup-shaped members 90 and 91, is a ball-race which is movable axially with reference to said members and is provided with upwardly extending portions 96 adapted to enter the radial extensions 94 of the opening thru the cup-shaped member 90, thereby preventing rotation of the ball-race while permitting it to adjust itself longitudinally and to a slight extent radially of the shaft 32. A spring 97, located between the flange 95 of the cup-shaped member 91 and the ball-race, serves to support the latter and the weight of the shaft 32 and the parts carried thereby which is exerted upon the ball-race thru the balls 98 therein, which are engaged by the cone bearing sleeve 95. With this construction of bearing, the ball-race is prevented from rotating, and objectionable wear between the ball-race and the cup-shaped member 90 is obviated.

The construction of my improved form of steadying bearing is shown at the bottom of Figure 10. The various parts of this bearing are secured to a mouth-piece 100 having a flaring opening therein and externally threaded so as to be capable of screwing into a threaded opening in the bottom of the extension 26 of the main frame of the machine. At its upper end, the mouth-piece 100 is provided externally with threads adapted to receive the internally threaded end of a shell 101. At its top, the shell 101 is provided with a flanged opening thru which the boss 50 of the bowl may be inserted. Within the shell 101 is a guide bushing 102, preferably made of wood, into which the boss 50 of the bowl extends. At its bottom, the bushing 102 is engaged by a washer 103 which is forced upwardly by a spring 104, located within the shell 101 and interposed between the washer 103 and a disc 105 resting on the top of the mouthpiece 100. The disc 105 is provided with an opening, the diameter of which depends upon the capacity of the particular separator in which it is used. By making this disc replaceable by other discs having holes of different sizes therein, it is possible to use the other parts of the steadying bearing in separators having widely differing capacities. In order to provide for drainage from the inside of the steadying bearing, the shell 101 is preferably provided with one or more openings 107; and the extension 26 is provided with one or a plurality of openings 108.

Owing to the high rate of speed at which the shaft 32, the coupling and the bowl rotate, it is highly desirable that these parts be well protected. The various forms of protecting means shown will now be described.

The form of bowl casing and coupling guard shown in Figure 1, has been hereinbefore described. As will be obvious from that figure, the bowl casing 40 at its bottom end engages the upper flanged end of the extension 26 of the frame. When it is desired to remove the bowl from the machine, the coupling guard 46 is slid upwardly on the plug 25, thereby permitting wrenches to be applied to the coupling for unscrewing the latter. After the coupling has been unscrewed, the bowl casing 40, the milk and cream pans 42 and 43 and the pan cover 44 may be tipped sideways and moved from the machine. All of these parts, and the bowl bottom and the dividing wall may then be disassembled for cleaning purposes. When it is desired to use the separator again, the parts may be reassembled by a reverse series of operations.

In Figure 11, the coupling guard 110 is shown rotatable as well as longitudinally movable, and provided with an opening at one side thru which access may be had to the coupling members, and thru which the top of the neck 54 of the bowl may be moved during installation and removal of the latter. While the machine is in use, the opening in the coupling guard is preferably turned toward the frame of the machine so that access thru it to the coupling is prevented.

Referring to Figures 12 and 13, in the form of the invention therein shown, the frame of the machine is provided with extending arms 113 upon the top of which the flanged portion 114 of the bowl casing 115 is adapted to rest. In order to increase the holding power of the arms 113, the latter may be provided with depressions 117 adapted to receive bosses struck out in the flanged portion 114 of the bowl casing. In the device of Figure 12, the coupling guard 119 is rotatably connected at its upper end to a plug 120 adapted to screw into the bottom of the gear case, said guard being provided with an opening sufficient to permit wrenches to be applied to the coupling and to permit the upper end of the bowl-neck to be moved outwardly after the coupling is disconnected.

Referring to Figure 14, in the device therein shown, the bottom of the bowl casing 122 is provided with one or more angular slots 123 adapted to co-operate with pins 124 in the extension 125 from the main frame of the machine, thereby providing a positive connection between the bowl casing and the frame. In this construction, the arms 127 extending from the main frame and engaged by the bottom of the flange on the bowl casing, are preferably smooth and not provided with any indentations such as those shown in Figure 12. The coupling guard 128 shown in Figure 14 is the same as the coupling guard shown in Figure 12.

While I have shown certain forms in which my invention may be embodied, it is to be understood that these may be modified in many respects without departing from the spirit of the invention as covered in the appended claims.

What I claim is:

1. In a cream separator, a frame, a driving mechanism and driving shaft supported by said frame, a bowl connected to said driving shaft and driven thereby, a forked extension from said frame near the top of said bowl, another extension from said frame near the bottom of said bowl, a cylindrical bowl casing having a flanged top adapted to rest on the top of said forked extension and adapted at its lower end to engage the other extension from said frame, and milk and cream pans supported by the flanged top of said bowl casing.

2. In a cream separator, a frame, a driving mechanism and driving shaft supported by said frame, a bowl supported by said driving shaft and driven thereby, an extension from said frame near the bottom of said bowl, a cylindrical bowl casing removably supported on said extension of the frame, milk and cream pans supported by said bowl casing, and movable cylindrical guard located between the top of the pans and the portion of the frame by which the driving shaft is supported.

3. In a cream separator of the tubular type, a bowl having a hollow neck, a coupling bolt mounted therein, and a driving shaft having a threaded hole adapted to receive the end of said bolt.

4. In a cream separator of the tubular type, a bowl having a hollow neck provided with a coupling face, a coupling bolt movably mounted in said hollow neck, and a driving shaft provided with a coupling face adapted to cooperate with the coupling face on said bowl-neck and having a threaded hole adapted to receive the end of said bolt, 5. In a cream separator of the tubular type, a frame, a driving mechanism and driving shaft supported by said frame, a tubular bowl, a coupling between said bowl and said driving shaft, and a cylindrical guard around said coupling adapted to be moved so as to permit access to the latter.

6. In a cream separator of the tubular type, a frame, a driving mechanism and driving shaft supported by said frame, a tubular bowl, a coupling between said bowl and said shaft, milk and cream pans located below said coupling in co-operative relation to said bowl, and a cylindrical guard engaging the top of the pans and surrounding said coupling and movable so as to permit access to the latter.

7. In a cream separator of the tubular type, a frame, a driving mechanism and driving shaft supported by said frame, a tubular bowl, a coupling between said bowl and said shaft, milk and cream pans located below said coupling in cooperative relation to said bowl, and a cylindrical guard engaging the top of the pans and said frame and surrounding said coupling and movable with reference thereto so as to permit access to said coupling.

8. In a cream separator of the tubular type, a frame, a driving mechanism and driving shaft supported by said frame, a tubular bowl, a coupling between said bowl and said shaft, milk and cream pans located below said coupling in cooperative relation to said bowl, and a cylindrical guard having an opening therein engaging the top of the pans and surrounding said coupling and rotatable with reference thereto so as to permit access to said coupling.

9. For use in a cream separator, a bowl having at one end an opening for the entrance of milk and at the other end converging, a hollow neck extending from the converging end of said bowl, a dividing wall having a tubular portion adapted to fit the inside of said hollow neck and having a flaring portion adapted to lie parallel to the converging inner surfaces of said bowl, and a coupling bolt carried by said neck and arranged to cooperate with said dividing wall and hold it in position.

10. For use in a cream separator, a bowl having at one end an opening for the entrance of milk and at the other end converging, a hollow neck extending from the converging end of said bowl, a dividing wall having a tubular portion adapted to fit the inside of said hollow neck and having a flaring portion adapted to lie parallel to the converging inner surface of said bowl, and a coupling bolt extending through said neck and provided with a head arranged to cooperate with the end of the said dividing wall and hold the latter in position.

11. For use in a cream separator, a bowl having at one end an opening for the entrance of milk and at the other end converging, a hollow neck extending from the converging end of said bowl, a dividing wall having a tubular portion provided with a flanged end and adapted to fit inside of said hollow neck and having a flaring portion adapted to lie parallel to the converging inner surface of said bowl, and a coupling bolt extending through said neck and provided with a head adapted to cooperate with the flanged end of said dividing wall and hold the latter in position.

12. For use in a cream separator, a bowl having at one end an entrance for milk and at the other end converging, a hollow neck extending from the converging end of said bowl and provided with a longitudinal slot extending from the converging portion of said bowl, a dividing wall having a tubular portion adapted to fit inside of said hollow neck and provided with a lug adapted to enter the slot in said neck, said dividing wall having a flaring portion adapted to lie parallel of the converging inner surface of said bowl, and means for removably securing said dividing wall in position in said bowl.

13. For use in a cream separator, a bowl having at one end an entrance for milk and at the other end converging, a hollow neck extending from the converging end of said bowl and provided with a longitudinal slot extending from the converging portions of said bowl, a dividing wall having a tubular portion adapted to fit inside of said hollow neck and provided with a lug adapted to enter the slot in said neck, said dividing wall having a flaring portion adapted to lie parallel of the converging inner surface of said bowl, a coupling bolt carried by said neck and arranged to cooperate with said dividing wall and hold the latter in position in said bowl.

14. For use in a cream separator, a bowl having at one end an entrance for milk and at the other end converging, a hollow neck provided with a slot extending from the converging end of said bowl, a dividing wall having a tubular portion adapted to fit the inside of said hollow neck and provided with a flanged end and a lug adapted to enter said slot, said dividing wall being provided with a flaring portion adapted to lie parallel with the converging inner surface of said bowl, and a coupling bolt carried by said neck and provided with a head adapted to cooperate with the flanged end of said dividing wall and hold the latter in position in said bowl.

15. For use in a cream separator, a bowl having at one end an opening for the entrance of milk and at the other end converging, a hollow neck extending from the converging end of said bowl, a dividing wall having a tubular portion adapted to fit inside of said hollow neck, said dividing wall being provided with a flaring portion adapted to lie parallel to the converging inner surface of said bowl and webs extending from said flaring portion and serving as spacers between said flaring portion and the bowl, and means for removably securing said dividing wall in operative position within said bowl.

16. In a cream separator of the tubular type, a frame, a driving mechanism and driving shaft supported by said frame, a tubular bowl connected to said driving shaft and driven thereby, and a steadying bearing having a mouthpiece adapted to be supported by said frame, a shell supported by said mouthpiece, a guide bushing within said shell, a removable disc having an opening therein in said shell and axially arranged with reference to said mouthpiece, and a spring between said disc and said guide bushing.

In testimony whereof I have affixed my signature to this specification.

ROBERT WARNOCK.